US008675226B2

(12) United States Patent
Gha

(10) Patent No.: US 8,675,226 B2
(45) Date of Patent: Mar. 18, 2014

(54) CONTROL POINT, IMAGE FORMING APPARATUS, AND METHOD OF CONTROLLING PRINTING

(75) Inventor: Hwang-hyeon Gha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 12/874,263

(22) Filed: Sep. 2, 2010

(65) Prior Publication Data

US 2011/0134465 A1 Jun. 9, 2011

(30) Foreign Application Priority Data

Dec. 3, 2009 (KR) ................. 2009-118996

(51) Int. Cl.
*G06F 3/12* (2006.01)
*G06K 15/00* (2006.01)

(52) U.S. Cl.
USPC .......... 358/1.15; 358/1.13; 358/1.16

(58) Field of Classification Search
USPC ........ 358/1.14, 1.15, 515, 521, 1.1–1.9, 358/1.11–1.18; 455/574; 710/8; 379/201.1
See application file for complete search history.

(56) References Cited

U.S. PATENT DOCUMENTS

| 7,764,981 | B2 * | 7/2010 | Kalofonos et al. ............ 455/574 |
| 2004/0240652 | A1 * | 12/2004 | Kanada ....................... 379/201.1 |
| 2007/0024903 | A1 * | 2/2007 | Kitahara et al. ............. 358/1.15 |
| 2007/0030514 | A1 * | 2/2007 | Shima .......................... 358/1.15 |
| 2007/0083679 | A1 * | 4/2007 | Kikuchi ............................ 710/8 |
| 2009/0132731 | A1 * | 5/2009 | Nakamura ...................... 710/19 |
| 2009/0177971 | A1 * | 7/2009 | Kim et al. ..................... 715/739 |
| 2009/0237710 | A1 * | 9/2009 | Lee .............................. 358/1.15 |

* cited by examiner

*Primary Examiner* — King Poon
*Assistant Examiner* — Ibrahim Siddo
(74) *Attorney, Agent, or Firm* — Stanzione & Kim, LLP

(57) ABSTRACT

A control point includes a communication interface to search for one or more image forming apparatuses using digital living network alliance (DLNA), a user interface unit through which at least one piece of content is selected for printing using a user interface of the control point, and through which an image forming apparatus is selected from among the searched image forming apparatuses to perform printing, a DLNA stack unit to set a connection policy regarding connection to the selected image forming apparatus, and to selectively control the DLNA connection status to the selected image forming apparatus according to the connection policy, and a controller to control the communication interface to transmit print data corresponding to the selected content-for-printing and the connection policy to the selected image forming apparatus.

18 Claims, 9 Drawing Sheets

FIG. 2A

```
<argument>

<name>CriticalAttributesList</name>

<direction>in</direction>

<relatedStateVariable>vender_defined_jobnotification="time_start 1 hour time_out=20min time_interval=1min"<relatedStateVariable>

// CD checks WiFi link of CP 1 hour after job is submitted, for 20 minutes with
1 minute period, and sends Job End Notification if link is confirmed. That is, CP turns
Wi-Fi link ON within the abovementioned time.

</argument>
```

FIG. 2B

```
<argument>

<name>CriticalAttributesList</name>

<direction>in</direction>

<relatedStateVariable>vender_defined_jobnotification="sddress=010-100-1000 message=Your print job is completed"<relatedStateVariable>

//printer sends SMS indicating "Your print job is completed" to 101-100-10000 when
job is completed.

</argument>
```

CONTROL POINT, IMAGE FORMING APPARATUS, AND METHOD OF CONTROLLING PRINTING

CROSS-REFERENCE TO RELATED APPLICATIONS

This application claims the benefit of priority under U.S.C. §119 (a) from Korean Patent Application No. 10-2009-0118996, filed on Dec. 3, 2009, in the Korean Intellectual Property Office, the disclosure of which is incorporated herein by reference in its entirety.

BACKGROUND

1. Field of the Invention

The present general inventive concept relates to a control print, an image forming apparatus, and a method of controlling printing. More particularly, the present general inventive concept relates to a control point, an image forming apparatus, and a method of controlling printing capable of reducing power consumption of the control point by selectively disconnecting a digital living network alliance (DLNA) connection between the control point and the image forming apparatus.

2. Description of the Related Art

Generally, an image forming apparatus such as a copier, a printer, a facsimile, or a multi function peripheral (MFP) which integrates the functions of the copier, printer, facsimile, etc., operates to print the print data generated by a terminal such as a computer onto a recording sheet.

Particularly, recent models of image forming apparatuses supporting digital living network alliance (DLNA) standard are able to receive the print data from a variety of DLNA apparatuses, as well as from a conventional terminal apparatus such as a computer.

The DLNA standard applies to the digital information technology industry, and is focused on the interoperability of the devices to share music, photos, videos, or the like. The DLNA aims to achieve convergence between related industries, and to establish a platform which is interoperable based on the existent standards of these industries. The DLNA works by defining guidelines for industries based on the Universal Plug 'n' Play ("UPnP") standard which is applied widely among the manufacturers of electronic devices, personal computers, and wireless devices.

With a DLNA device, users can use a variety of content of the DLNA network, and output desired content through an image forming apparatus connected to the DLNA network.

Meanwhile, according to the conventional way of printing in a DLNA environment, a wireless link has to be maintained between the DLNA device and the DLNA image forming apparatus until a print job is completed. This raises a problem, since if the DLNA device is a portable terminal, the terminal keeps consuming battery power in order to maintain the wireless link. However, the DLNA does not always have to keep a wireless link with the image forming apparatus. For example, the DLNA does not need to keep a wireless link with the image forming apparatus if the DLNA device does not store the content being currently printed. Accordingly, a method is necessary which enables a selective shifting of connection status between the DLNA device and the DLNA image forming apparatus during a print job processing

SUMMARY

The present general inventive concept provides a control point, an image forming apparatus, and a method of controlling printing, capable of saving power consumption of the control point by selectively disconnecting a wireless communication connection between the control point and the image forming apparatus.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a control point (CP) connectable to one or more image forming apparatuses using digital living network alliance (DLNA), the control point including a communication interface (CI) to search the one or more image forming apparatuses using the DLNA, a user interface (UI) unit through which at least one piece of content is selected for printing using a user interface of the control point, and through which an image forming apparatus is selected from among the searched image forming apparatuses to perform printing, a DLNA stack unit to set a connection policy regarding connection to the selected image forming apparatus and to selectively control the DLNA connection status to the selected image forming apparatus according to the connection policy, and a controller to control the communication interface to transmit print data corresponding to the selected content-for-printing and the connection policy to the selected image forming apparatus.

The connection policy may include at least one of a manner of terminating connection, a time to start connection, a time to end connection, a time interval between connected status (ON) and disconnected status (OFF), and reception information of the control point.

The reception information of the control point may include address information of the control point to receive a notification of print job completion.

The DLNA stack unit keeps disconnected status (OFF) until a notification of print job completion is received from the selected image forming apparatus according to the connection policy, or periodically connects (ON) and disconnects (OFF) to receive the notification of print job completion from the selected image forming apparatus.

The communication interface receives a response to the transmitted connection policy from the selected image forming apparatus.

The DLNA stack unit disconnects the DLNA connection from the selected image forming apparatus after print data regarding the content-for-printing is transmitted to the selected image forming apparatus if the content-for-printing is stored in an external control point, or disconnects the DLNA connection from the selected image forming apparatus after the content-for-printing is transmitted to the selected image forming apparatus, if the content-for-printing is stored in the control point.

The DLNA stack unit re-connects the DLNA connection to the selected image forming apparatus if a predetermined time elapses from the time at which the DLNA connection is disconnected from the selected image forming apparatus, or if a short message service (SMS) is received from the selected image forming apparatus.

The foregoing and/or other features and utilities of the present general inventive concept may also be achieved by providing an image forming apparatus connectable to one or more control points (CP) using digital living network alliance (DLNA), which may include a communication interface (CI) to receive from the control point a connection policy regarding the control point and print data regarding content-forprinting, a DLNA stack unit to control the communication interface to receive the content-for-printing corresponding to the print data, an image forming unit to print the content-for-printing based on the received print data, and a controller to notify completion of printing the content-for-printing based on the received connection policy.

The image forming apparatus may additionally include a short message service (SMS) transmitting unit to transmit an SMS message. The connection policy includes an SMS reception address of the control point, and the controller controls the SMS transmitting unit to transmit an SMS message to indicate that printing of the content-for-printing is completed, based on the SMS reception address.

The connection policy may include at least one of time information of the control point including a time to start connection, a time to end connection, and a time interval between connected status (ON) and disconnected status (OFF), and the controller may transmit a notification of print job completion regarding the content-for-printing based on the time information of the control point.

The controller may check a DLNA connection status of the control point based on the time information of the control point.

The foregoing and/or other features and utilities of the present general inventive concept may also be achieved by providing a method of controlling printing of a control point (CP) which is connectable to one or more image forming apparatuses using digital living network alliance (DLNA), which may include selecting one or more content-for-printing using a user interface (UI) of the control point, searching for one or more image forming apparatuses using the DLNA, selecting an image forming apparatus to perform printing from among the searched image forming apparatuses, setting a connection policy regarding connection to the selected image forming apparatus, transmitting print data and the connection policy corresponding to the selected content-for-printing to the selected image forming apparatus, and selectively controlling the DLNA connection to the selected image forming apparatus according to the connection policy.

The connection policy may include at least one of a manner of terminating connection, a time to start connection, a time to end connection, a time interval between connected status (ON) and disconnected status (OFF), and a reception information of the control point.

The reception information of the control point may include address information of the control point to receive a notification of print job completion.

The step of selectively connecting the DLNA connection may include keeping disconnected status (OFF) until a notification of print job completion is received from the selected image forming apparatus according to the connection policy, or periodically connecting (ON) and disconnecting (OFF) the connection to receive the notification of print job completion from the selected image forming apparatus.

The method may additionally include receiving a response to the transmitted connection policy from the selected image forming apparatus.

The step of selectively controlling the DLNA connection may include disconnecting the DLNA connection from the selected image forming apparatus after print data regarding the content-for-printing is transmitted to the selected image forming apparatus if the content-for-printing is stored in an external control point, or disconnecting the DLNA connection from the selected image forming apparatus after the content-for-printing is transmitted to the selected image forming apparatus if the content-for-printing is stored in the control point.

The step of selectively controlling the DLNA connection may include re-connecting the DLNA connection to the selected image forming apparatus if a predetermined time elapses from the time at which the DLNA connection is disconnected from the selected image forming apparatus or if a short message service (SMS) is received from the selected image forming apparatus.

The foregoing and/or other features and utilities of the present general inventive concept may be achieved by providing a method of controlling printing of an image forming apparatus connectable to one or more control points (CP) using digital living network alliance (DLNA), which may include receiving from the control point a print request regarding content-for-printing including a connection policy regarding the control point, receiving print data regarding the content-for-printing and the content-for-printing, printing the content-for-printing based on the received print data, and notifying completing the printing of the content-for-printing based on the received connection policy.

The connection policy may include a short message service (SMS) reception address of the control point, and the notifying may include transmitting an SMS message to indicate that printing of the content-for-printing is completed, based on the SMS reception address.

The connection policy may include at least one of time information of the control point including time to start connection, time to end connection, and time interval between connected status (ON) and disconnected status (OFF), and notifying may include transmitting a notification of print job completion regarding the content-for-printing based on the time information of the control point.

The method may additionally include checking a DLNA connection status of the control point based on the time information of the control point.

Features and/or utilities of the present general inventive concept may also be realized by a method of performing an imaging operation in a digital living network alliance (DLNA) network including a control point and at least one image forming apparatus, the method including generating a print request at the control point, transmitting the print request and a connection policy to the image forming apparatus, controlling the connection between the control point and the image forming apparatus according to the connection policy, and transmitting print data to the image forming apparatus.

Controlling the connection between the control point and the image forming apparatus may include, when the print data is transmitted to the image forming apparatus from a device external to the control point, disconnecting the control point from the image forming apparatus after transmitting the print request and connection policy, and, when the print data is transmitted to the image forming apparatus from the control point, maintaining a data connection between the control point and the image forming apparatus during a corresponding print operation of the image forming apparatus.

Disconnecting the control point from the image forming apparatus further may include re-connecting the control point to the image forming apparatus at predetermined intervals of time to receive data from the image forming apparatus regarding the corresponding print operation.

The method may further include, when the print data is transmitted to the image forming apparatus from a device external to the control point, generating an SMS message regarding a completion of the corresponding print operation when the corresponding print operation is completed.

Features and/or utilities of the present general inventive concept may also be realized by a control point of a digital living network alliance (DLNA) network including at least one image forming apparatus including a user interface to initiate a print operation, a DLNA stack unit to generate a connection policy to control a DLNA connection between the control point and the image forming apparatus, a communication interface to transmit to the image forming apparatus the connection policy and print data corresponding to the print operation, and a controller to control the communication interface to transmit the connection policy an print data to the image forming apparatus and to control a connection status between the communication interface and the image forming apparatus according to the connection policy.

The controller may control the communication interface such that when the print data is transmitted to the image forming apparatus from a device external to the control point, the controller disconnects the control point from the image forming apparatus after transmitting the print request and connection policy, and when the print data is transmitted to the image forming apparatus from the control point, the controller maintains a data connection between the control point and the image forming apparatus during a corresponding print operation of the image forming apparatus.

After disconnecting the control point from the image forming apparatus, the controller may further re-connect the control point to, and disconnect the control point from, the image forming apparatus at predetermined intervals of time to receive data from the image forming apparatus regarding the corresponding print operation.

When the print data is transmitted to the image forming apparatus from a device external to the control point, the communication interface may receive an SMS message regarding a completion of the corresponding print operation when the corresponding print operation is completed.

Features and/or utilities of the present general inventive concept may also be realized by an image-forming apparatus of a digital living network alliance (DLNA) network including at least one control point including an image forming unit to from an image corresponding to a print operation, a communication interface to receive from the control point a connection policy corresponding to the print operation, a DLNA stack unit to receive the connection policy from the communication interface, and a controller to control operation of the image forming unit and to control a DLNA connection between the image forming apparatus and the control point based on the connection policy received from the control point.

The controller may control the communication interface such that when the print data is transmitted to the image forming apparatus from a device external to the control point, the controller disconnects the image-forming apparatus from the control point after receiving the connection policy from the control point, and when the print data is transmitted to the image forming apparatus from the control point, the controller maintains a data connection between the control point and the image forming apparatus during a corresponding print operation of the image forming apparatus.

After disconnecting the image-forming apparatus from the control point, the controller may further re-connect the image-forming apparatus to, and disconnect the image-forming apparatus from, the control point at predetermined intervals of time to receive data from the image forming apparatus regarding the corresponding print operation.

The predetermined intervals of time may be defined by the connection policy. The image-forming apparatus may further include an SMS transmitting unit to generate and transmit an SMS message regarding a completion of the corresponding print operation when the corresponding print operation is completed.

Features and/or utilities of the present general inventive concept may also be realized by a digital living network alliance (DLNA) network including at least one control point and at least one image-forming apparatus. The control point may include a user interface to initiate a print operation, a first DLNA stack unit to generate a connection policy to control a DLNA connection between the control point and the image forming apparatus, a first communication interface to transmit to the image forming apparatus the connection policy and print data corresponding to the print operation, and a first controller to control the communication interface to transmit the connection policy an print data to the image forming apparatus and to control a connection status between the communication interface and the image forming apparatus according to the connection policy. The image forming apparatus may include an image forming unit to from an image corresponding to the print operation, a second communication interface to receive from the control point the connection policy corresponding to the print operation, a second DLNA stack unit to receive the connection policy from the communication interface, and a second controller to control operation of the image forming unit and to control a DLNA connection between the image forming apparatus and the control point based on the connection policy received from the control point.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 2A and 2B illustrate examples of connection policies which are generated according to the present general inventive concept;

DETAILED DESCRIPTION OF THE EMBODIMENTS

Figure 1:
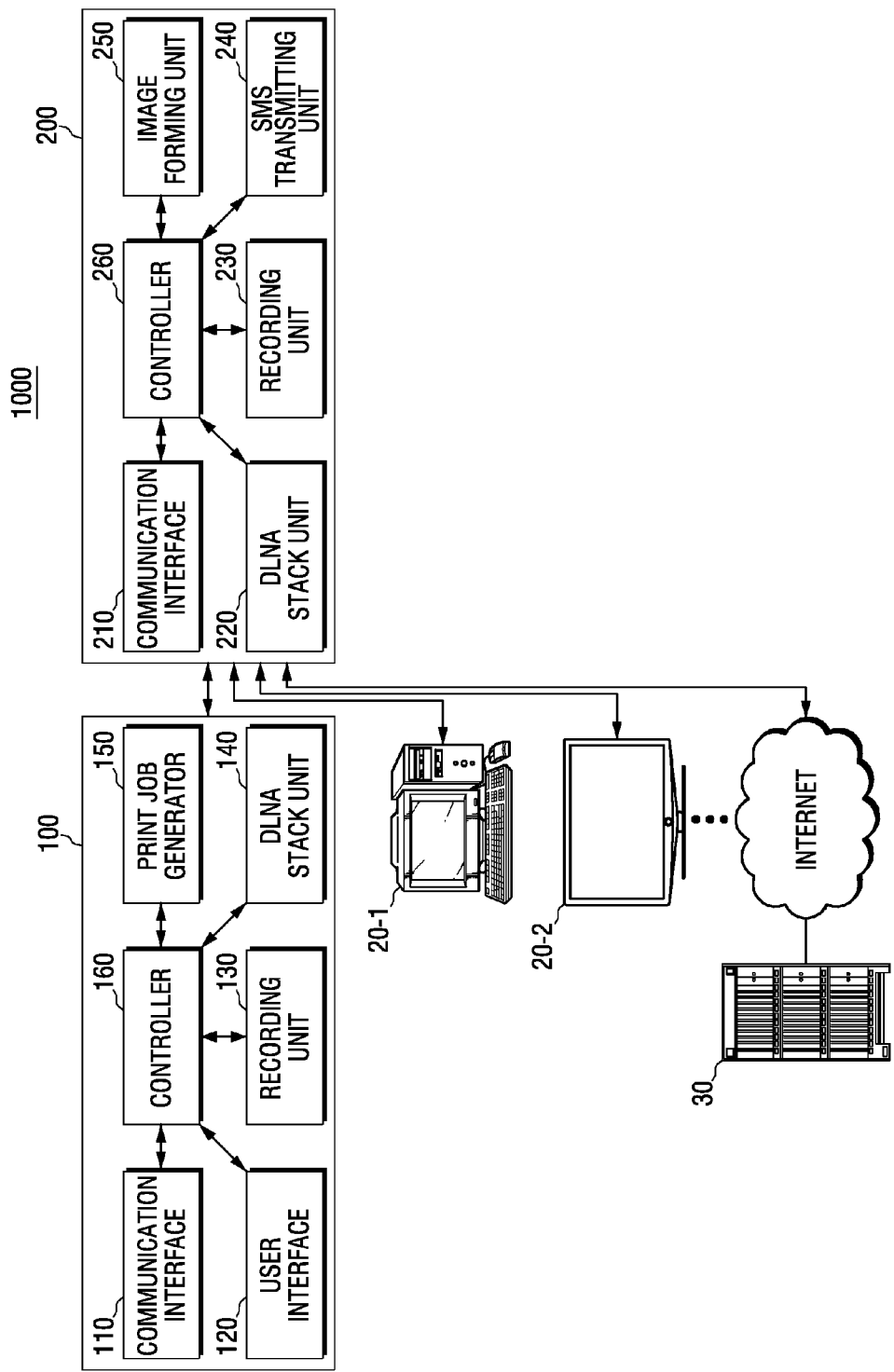
FIG. 1 illustrates a block diagram of a printing control system according to the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 illustrates a block diagram of a printing control system according to the present general inventive concept.

Referring to FIG. 1, a print control system 1000 includes a control point (CP), or control point apparatus, 100 and an image forming apparatus 200.

The control point 100 may connect to at least one image forming apparatus 200, and request the image forming apparatus 200 to print out content-for-printing upon receiving a print command from a user. The control point 100 can selectively control a digital living network alliance (DLNA) connection to the image forming apparatus 200 according to a wireless communication connection policy ('connection policy') corresponding to the location of storing the content-for-printing.

Herein, the control point 100 is a DLNA-compatible device that can share data with the other control points (20-1, 20-2, . . . ) in the DLNA network, and can connect wirelessly to the DLNA image forming apparatus 200 in the DLNA network to output content. By way of example, DLNA device may be one of digital media server (DMS), digital media player (DMP), and a digital media renderer (DMR) specified by the DLNA guidelines. The data, content, or media may be any type of digital data including audio or visual files or information, control signals to control different devices of the network, addresses, print data, display data, timing information, html-formatted data, text, or any other type of data that may be transmitted via the DLNA network. In the specification below, with reference to a printing operation, "content" may refer to the text, graphics, and photographs that are to be printed, and "print data" may refer to all the data that allows the image-forming apparatus to print the content, such as format data, shading, color data, page and document data, etc.

The DMS is a media server device (MSD) in the UPnP AV area, to provide digital media content. The DMS device searches digital media content items in the DMS so that a user of the DLNA network can display or distribute the digital media content. By way of example, the DMS can include a VCR, CD player, DVD player, MP3 player, set-top box (STB), TV tuner, radio tuner, or TV.

The DMR, such as a TV or stereo speaker, operates to execute or output the selected media. The DMP is a DMR that includes a UPnP control point and acts as both a media renderer device (MRD) and a media render control point (MRCP). In other words, the DMP may select media content and execute or output the selected media content.

Specifically, the control point 100 may include a communication interface (CI) 110, a user interface (UI) 120, a recording unit 130, a DLNA stack 140, a print job generator 150, and a controller 160.

The communication interface 110 is connected to the DLNA network, and can share contents with the other control points (20-1, 20-2, . . . ) in the DLNA network. Specifically, the communication interface 110 performs communication with the other CPs (20-1, 20-2, . . . ) in the DLNA network according to the UPnP standard, and thus can share contents stored in the other control points (20-1, 20-2, . . . ).

The term 'content-for-printing' ('content') includes image data, text, HTML documents, or files for direct printing in the image forming apparatus 200. The 'direct printing' is a way of performing print job by simply transmitting a corresponding file to the image forming apparatus 200 without requiring additional file conversion. By way of example, JPG, PDF, or XPS files can be directly printed.

Upon receiving a print command from the user, communication interface 110 may search for at least one image forming apparatus 200 connected to the DLNA. When found, the image forming apparatus 200 may be displayed on the control point apparatus 100 via the user interface 120.

If the user selects the image forming apparatus 200 to perform the print job, the communication interface 110 may request the selected image forming apparatus 200 in the DLNA network to perform printing in compliance with the DLNA standard and the DLNA printer standards. Herein, the communication interface 110 may include the connection policy which will be explained below. Specifically, the communication interface 110 may transmit to the image forming apparatus 200 'CreateJob2' or 'CreateURLJob'. 'CreateJob2' and 'CreateURLJob' are the commands requesting printing which can include 'CriticalAttribute' therein. 'CreateJob2,' 'CreateURLJob,' and 'CriticalAttribute' will be explained in greater detail below.

The communication interface 110 may receive from the image forming apparatus 200 information such as job ID, or destination URL (to transmit print data to) which may be transmitted in response to the notification of print job completion.

The communication interface 110 may transmit and receive data to and from the image forming apparatus 200. Specifically, the communication interface 110 may be connected to the image forming apparatus 200 in a variety of wireless communication methods, such as Near Field Communication (NFC), WiFi, or Bluetooth communication, and may transmit to the image forming apparatus 200 the print data generated in the print job generator 150, which will be explained in detail below, content previously stored in the recording unit 130, and a connection policy of the control point 100 generated in the DLNA stack unit 140. The communication interface 110 may receive an ACK signal from the image forming apparatus 200 as a response to the connection policy. If the communication interface 110 does not receive ACK within a predetermined time, the communication interface 110 may re-send the connection policy to the image forming apparatus 200.

The communication interface 110 may receive a notification of print job completion from the image forming apparatus 200. Specifically, the communication interface 110 may receive the notification of print job completion from the image forming apparatus 200 using wireless communication method such as WiFi, and if the control point 100 is a device such as a mobile phone which provides a short message service (SMS), the communication interface 110 may receive a notification of print job completion via an SMS message.

The UI 120 has a plurality of function keys to enable a user to set or select various functions supported by the control point 100 and may display various information provided by the control point 100. The UI 120 may be applied as a device such as touch pad, through which concurrent input and output are possible, or a device combining mouse and monitor. Accordingly, through the user interface window provided by the UI 120, the user can select at least one piece of content-for-printing. Herein, the user may request to print the contents or print data stored in the other CPs (20-1, 20-2, . . . ) as well as the contents stored in the control point 100. Additionally, the user may select various printing options related to the content output.

The UI 120 may display the image forming apparatuses 200 found during the search. Specifically, the UI 120 may display the image forming apparatuses 200 located in the search via the communication interface 110, and may receive a selection for one of the displayed image forming apparatuses 200 as the image forming apparatus 200 to carry out the print job.

The UI 120 may also receive a user's confirmation regarding the disconnecting of the DLNA connection. Specifically, prior to disconnecting the DLNA connection from the found image forming apparatus 200, the UI 120 may display corresponding information to the user and have the user confirm the disconnection of the DLNA connection from the image forming apparatus 200.

The recording unit 130 may store contents. Specifically, the recording unit 130 may store a variety of contents in advance, and may also record contents received from the other control points (20-1, 20-2, . . . ) through the communication interface 110. The recording unit 130 may also store the print data generated in the print job generator 150 which will be explained in detail below. The recording unit 130 may be a removable disk including USB memory, a recording medium connected to the host, or a web server via network.

The DLNA stack unit 140 may control the communication interface 110 to perform communication with the control points (20-1, 20-2, . . . ) or the image forming apparatus 200 in the DLNA network in compliance with the DLNA standard and the DLNA printer standard. Specifically, when a user's selection for the image forming apparatus to perform print job is received, the DLNA stack unit 140 forms a wireless link to the selected image forming apparatus 200 (that is, establishes a connection in compliance with the corresponding wireless communication method), and selectively controls the DLNA connection with the selected image forming apparatus 200 in accordance with the connection policy corresponding to the location where the content is stored.

Specifically, if the content is stored in an external control point, the DLNA stack unit 140 disconnects the DLNA connection after the print data regarding the content is transmitted to the selected image forming apparatus 200, and re-connects the DLNA connection to the selected image forming apparatus 200 if a predetermined time (that is, a time spanning from the time of disconnection to the time to start connection) elapses.

If the content is stored in the control point 100, the DLNA stack unit 140 disconnects the DLNA connection after the print data is transmitted to the selected image forming apparatus 200, and re-connects the DLNA connection to the selected image forming apparatus 200 if a predetermined time (that is, a time spanning from the time of disconnection to the time to start connection) elapses. Additionally, the DLNA stack unit 140 may re-connect the DLNA connection if a predetermined time elapses, and disconnect (OFF) and connect (ON) periodically in accordance with a predetermined time interval between connection (ON) and disconnection (OFF).

Meanwhile, if the control point 100 is a device such as a mobile phone capable of SMS reception, the DLNA stack unit 140 may re-connect the DLNA connection to the selected image forming apparatus 200 upon receiving an SMS message from the image forming apparatus 200 indicating that the print job is completed. In one example, the DLNA stack unit 140 may receive an SMS message regarding various events such as status change, error generation, or the like, which are generated in the image forming apparatus 200 after the DLNA disconnection. By way of example, if an SMS message is received indicating that the print job is completed, the DLNA stack unit 140 may maintain the DLNA disconnection status unless DLNA connection is necessary. For example, the DLNA stack unit 140 may maintain the DLNA disconnection status unless a user command is input requesting an additional print.

The DLNA stack unit 140 may generate a connection policy in the control point 100. Specifically, the DLNA stack unit 140 may generate a connection policy based on the location information about the content for which a print command is input. The connection policy may include a way of ending a connection (regarding whether to end the connection after transmitting the print data, or after transmitting the content), reception information of the control point 100 (that is, address information of the control point 100 to receive a notification of print job completion, for example, URL and port information, or SMS address of the control point 100), or time information of DLNA connection of the control point 100 (for example, time to start connection, time to end connection, or time interval between connection (ON) and disconnection (OFF). The connection policy generated in the DLNA stack unit 140 will be explained in more detail below with reference to FIGS. 2A and 2B.

The DLNA stack unit 140 may control the communication interface 110 to include the generated connection policy in the notification of print job completion and transmit the notification of print job completion to the selected image forming apparatus 200. Although the DLNA stack unit 140 and the communication interface 110 are depicted as separate components according to an example of the present general inventive concept, the functions of the DLNA stack unit 140 and the communication interface 110 may be integrated into a single component.

The DLNA stack unit 140 may include memory and logic and a processor, or may share a processor of the controller 160. The memory and logic may be programmed to generate the connection policy and to control the connection of the communication interface 110 to external DLNA devices.

The print job generator 150 generates print data regarding the content. Specifically, the print job generator 150 may generate XHTML-Print data regarding the content selected by the user so that the selected content is output in response to a user's print command. Herein, the print job generator 150 may generate XHTML-Print data using a pre-stored template. Meanwhile, the process of generating print data may be omitted if the user-selected content is previously-generated XHTML-Print data or XHTML-Print data stored in the other control points (20-1, 20-2, . . . ).

The controller 160 controls the respective components of the control point 100. Specifically, upon receiving a print command regarding the content through the UI 110, the controller 160 may control the UI 120 to display a UI window so that at least one image forming apparatus 200 is selected to perform printing. Accordingly, as the user selects the image forming apparatus 200, the controller 160 may control the print job generator 150 to generate print data regarding the corresponding content. Meanwhile, the above-mentioned process may be omitted, if the user's print command pertains to the print data stored in the other control points (20-1, 20-2, . . . ) or previously-generated print data.

The controller 160 may store the generated print data in the recording unit 130. Specifically, this applies when the content is printed repeatedly. In this case, if a print command regarding the same content is received, the controller 160 stores the print data generated in the print job generator 150 to the recording unit 130, so that printing is carried out efficiently using the previously-stored print data.

The controller 160 may control the communication interface 110 to request the selected image forming apparatus 200 to perform printing. Specifically, if the user's print command is about the content stored in the control point 100, the controller 160 may control the communication interface 110 to transmit 'CreateJob2' to the selected image forming apparatus 200, and if the user's print command is about XHTML-Print data within the other CPs (20-1, 20-2, . . . ), the controller 160 may control the communication interface 110 to transmit 'CreateURLJob' to the selected image forming apparatus 200. Herein, the controller 160 may control the communication interface 110 to include the connection policy generated by the DLNA stack unit 140 in the print request. Specifically, the controller 160 may control the communication interface 110 to include the connection policy in 'CreateJob2' or 'CreateURLJob' in the form of 'CriticalAttribute' and to transmit the 'CreateJob2' or 'CreateURLJob'.

If receiving print job ID and destination URL from the selected image forming apparatus 200 as a response to the print request, the controller 160 may control the communication interface 110 to transmit the generated print data to the selected image forming apparatus 200. Meanwhile, if the user inputs a print command regarding the print data stored in the other CPs (20-1, 20-2, ...), the controller 160 may control the communication interface 110 to transmit corresponding information to the other CPs (20-1, 20-2, ...) so that the print data stored in the other CPs (20-1, 20-2, ...) may be transmitted to the selected image forming apparatus 200.

The controller 160 may also control the recording unit 130 and the communication interface 110 so that content is transmitted in response to a request for content transmission made by the selected image forming apparatus 200.

The controller 160 may disconnect and re-connect the DLNA connection from and to the selected image forming apparatus 200 in accordance with the connection policy. Specifically, if the user's print command pertains to content within the control point 100, the controller 160 may control the communication interface 110 so that the DLNA connection is ended after the corresponding content is transmitted to the selected image forming apparatus 200, and if the user's print command pertains to content within the other CPs (20-1, 20-2, ...), the controller 160 may control the communication interface 110 to terminate the DLNA connection after the print data is transmitted to the image forming apparatus 200. The controller 160 may control the communication interface 110 to re-connect the DLNA connection to the selected image forming apparatus 200 if a predetermined time interval until a time to start connection according to the connection policy elapses, or if an SMS message is received from the selected image forming apparatus 200.

As explained above, the control point 100 according to the present general inventive concept is capable of disconnecting a DLNA connection from a selected image forming apparatus 200 according to the connection policy, and thus saving power consumed by the control point 100 to maintain DLNA connection.

The image forming apparatus 200 may be connected to at least one control point (100, 20-1, 20-2, ...) in a wireless communication manner and may perform a series of print jobs in response to the notification of print job completion received from the control point 100.

Herein, the image forming apparatus 200 may include, but is not limited to, a printer, a facsimile, a scanner, or a multi function peripheral integrating the printing, facsimile, or scanning functions therein, which is capable of transmitting and receiving data to and from the control point 100 in a wireless communication manner such as near field communication (NFC), WiFi, or Bluetooth communication.

Referring to FIG. 1, the image forming apparatus 200 may include a communication interface (CI) 210, a DLNA stack unit 220, a recording unit 230, an SMS transmitting unit 240, an image forming unit 250, and a controller 260.

The communication interface 210 may transmit and receive data to and from the CPs (100, 20-1, 20-2, ...) in the DLNA network. Specifically, the communication interface 210 may be connected to the control point 100 using various communication methods, such as NFC, WiFi, or Bluetooth communications.

The communication interface 210 may receive a print request from the control point 100 and may transmit corresponding information to the DLNA stack unit 220. The communication interface 210 may transmit an acknowledge signal ACK to the control point 100 in response to the notification of print job completion received.

The communication interface 210 may receive print data and content from the CPs (100, 20-1, 20-2 ...) in the DLNA network. Specifically, the communication interface 210 may pull the print data (XHTML-Print data) by an HTTP GET method.

The DLNA stack unit 220 may control the communication interface 210 to receive content and print data regarding the content in response to the notification of print job completion about the content. Specifically, if receiving a print request regarding the content, the DLNA stack unit 220 may control the communication interface 210 to notify a corresponding job ID and a destination URL to the control point 100 as a response. If receiving print data from the control points (100, 20-1, 20-2, ...), the DLNA stack unit 220 may request, using the communication interface 210, the control points (100, 20-1, 20-2, ...) corresponding to the content address written in the received print data for the content.

The recording unit 230 may record the received print data and content. Specifically, the recording unit 230 may record the print data and content which are received via the communication interface 210. The recording unit 230 may also record a connection policy included in the notification of print job completion regarding the content. The recording unit 230 may be internal or external recording medium of the image forming apparatus, such as a removable disk including a USB memory.

If the connection policy contains an SMS reception address of the control point 100, the SMS transmitting unit 240 may transmit to the SMS reception address of the control point 100 an SMS message indicating that a printing is completed. The SMS transmitting unit 240 may transmit not only an SMS message indicating print completion, but also an SMS message containing information about various events generated in the image forming apparatus 200. The image forming apparatus 200 may send out SMS messages directly or indirectly using an SMS transmitting server 30.

The image forming apparatus 250 may print out received content. Specifically, the image forming apparatus 250 may print the content based on the print data received via the communication interface 210.

The controller 260 controls the respective components inside the image forming apparatus 200. Specifically, the controller 260 may control the communication interface 210 and the DLNA stack unit 220 to transmit a corresponding job ID and destination URL to the control point 100, if receiving a notification of print job completion regarding the content via the communication interface 210.

The controller 260 may also control the image forming apparatus 250 to print out corresponding content based on the received print data, if receiving the print data and the content via the communication interface 210. Upon completing printing of the corresponding content, the controller 260 may notify the control point 100 of the completion of printing in accordance with the connection policy included in the received notification of print job completion.

Specifically, if an SMS reception address of the control point 100 is written in the connection policy, the controller 260 may control the SMS transmitting unit 240 to send out an SMS message to the control point 100. If time information is written in the connection policy, the controller 260 may control the communication interface 210 to notify completion of printing on re-connection time written in the connection policy. The controller 260 may notify the control point 100 when printing is completed, after checking the DLNA connection status of the control point 100.

As explained above, the image forming apparatus 200 according to the present general inventive concept receives a connection policy from the control point 100, and thus is capable of transmitting a notification of print job completion to the control point 100 even when a DLNA connection between the control point 100 and the image forming apparatus 200 is disconnected for a certain period of time.

FIGS. 2A and 2B illustrate examples of connection policy which is generated according to the present general inventive concept.

Specifically, FIG. 2A illustrates an example of the connection policy which includes time information for DLNA connection, and FIG. 2B illustrates an example of the connection policy which includes an SMS reception address.

Referring to FIG. 2A, the connection policy may be transmitted to the image forming apparatus 200 in the form of 'CriticalAttribute' according to the DLNA standard. The time information regarding the DLNA connection between the control point 100 and the image forming apparatus 200 is written in the connection policy. Specifically, 'Time_start' represents a time at which checking on the DLNA connection status of the control point 100 starts so that a notification of print job completion can be sent based on the time when the print request is executed. 'Time_out' information represents the duration of time in which the DLNA connection status of the control point 100 is checked after Time_start'. 'Time_interval' (interval between connection (ON) and disconnection (OFF)) represents period of checking the DLNA connection status during 'Time_out'.

Accordingly, the image forming apparatus 200 may transmit a notification of print job completion to the control point 100 using the written time information.

Referring to FIG. 2B, the connection policy includes an SMS reception address of the control point 100. Upon completing the printing, the image forming apparatus 200 may transmit an SMS indicating the completion of printing to the SMS reception address of the control point 100.

Although the connection policy includes either SMS reception address or DLNA connection time information of the control point 100 in the examples explained above according to the present general inventive concept, it should be understood that both types of the information may be transmitted to the image forming apparatus 200, and the image forming apparatus 200 may use the information selectively or both, in transmitting the notification of print job completion to the control point 100.

FIGS. 3 to 6 illustrate views provided to explain an image forming method according to the present general inventive concept.

Figure 3:
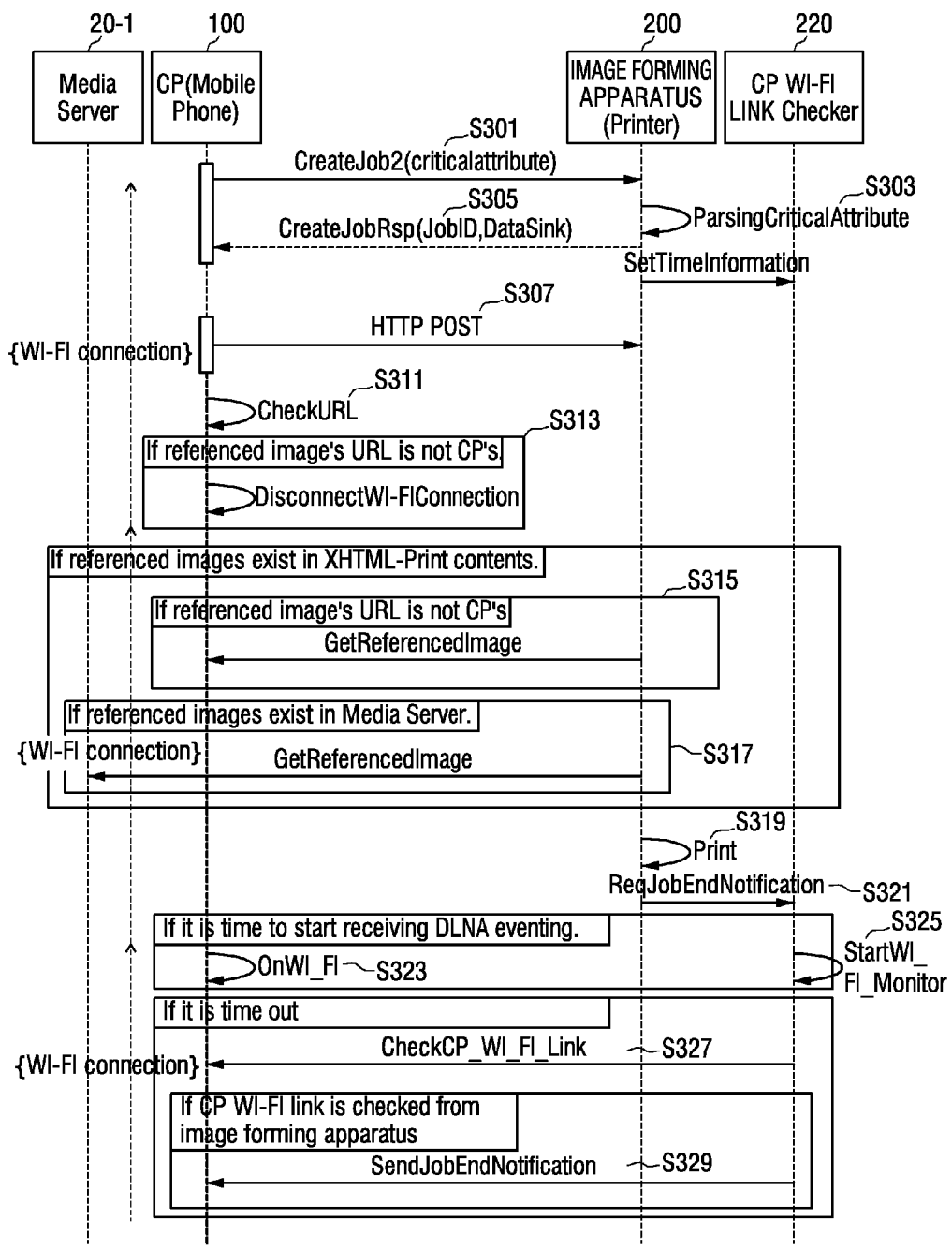
FIGS. 3 to 6 illustrate image forming methods according to embodiments of the present general inventive concept.
Figure 4:
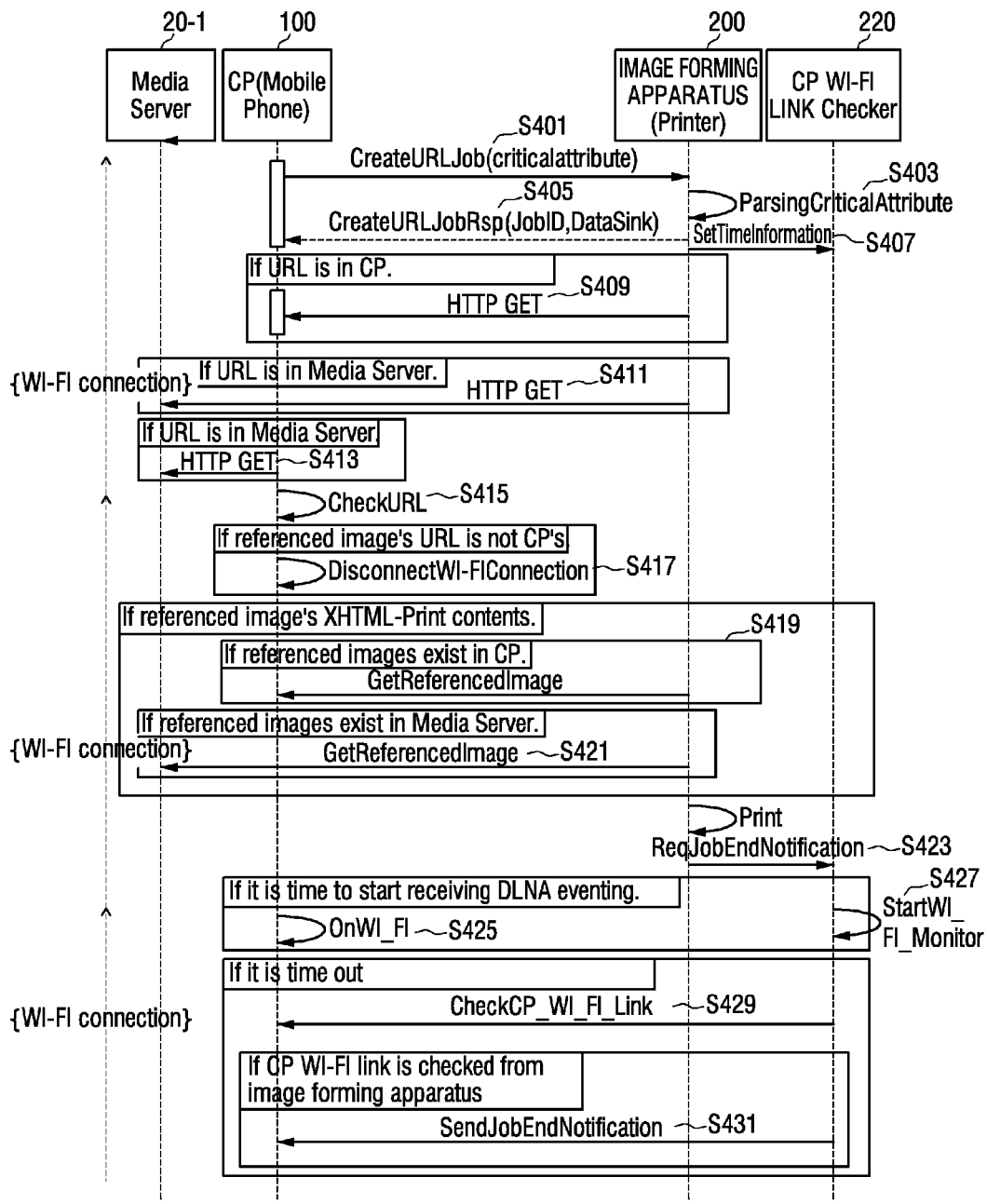
Figure 5:
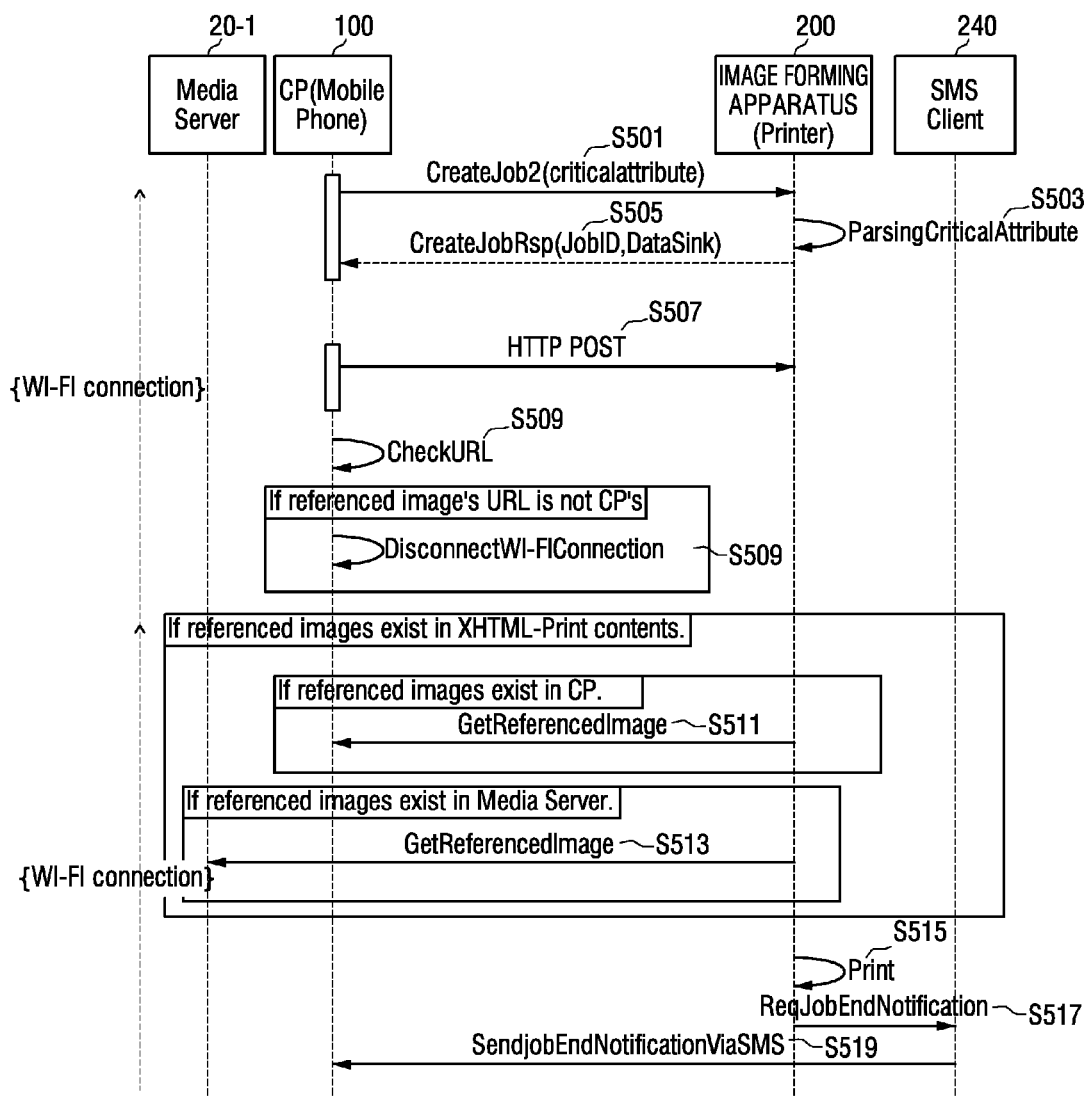
Figure 6:
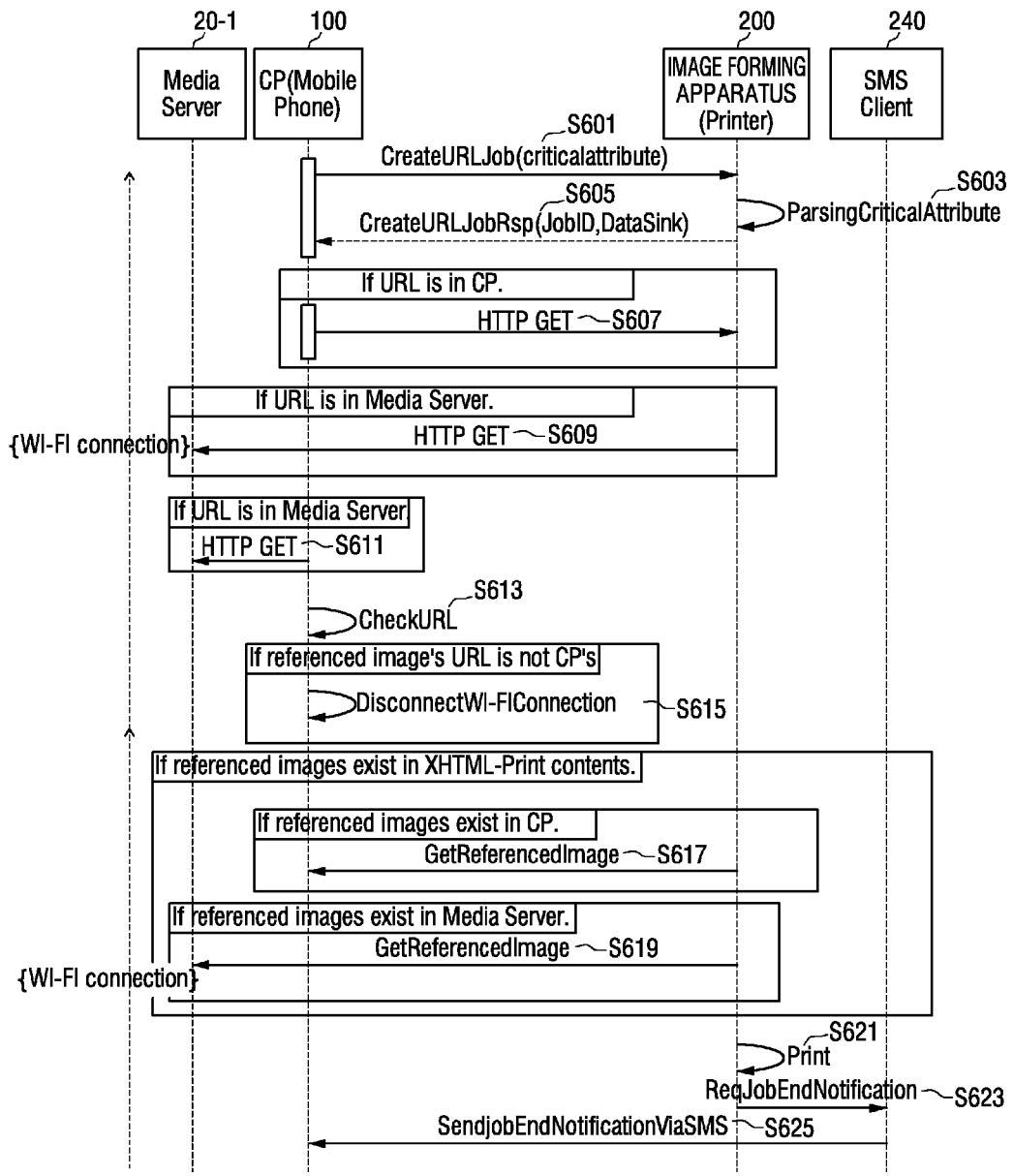

Specifically, FIGS. 3 and 4 illustrate embodiments in which the time information regarding DLNA connection is transmitted to the image forming apparatus 200 as the connection policy, while FIGS. 5 and 6 illustrate embodiments in which the SMS reception address is transmitted to the image forming apparatus 200 as the connection policy.

Referring to FIG. 3, at operation S301, the control point 100 transmits 'CreateJob2' to the image forming apparatus 200 to thereby request printing. 'CreateJob2' may include the connection policy (that is, 'CriticalAttribute') as illustrated in FIG. 2A.

At operation S303, in response to 'CreateJob2', the image forming apparatus 200 analyzes the received connection policy, and at operation S305, transmits a job ID and a destination URL ('Datasink') to the control point 100.

At operation S307, the control point 100 transmits print data to the image forming apparatus 200 using the 'Datasink' received. At operation S313, the control point 100 checks an address at which the content is located ('referenced image URL') within the print data transmitted to the image forming apparatus 200, and disconnects WiFi connection if the transmitted print data does not have the referenced image URL, or if the referenced image URL corresponds to the other control point (20-1, 20-2, . . . ). Since the control point 100 does not have to maintain WiFi connection for the entire duration of performing the print job, less power is consumed.

Meanwhile, at operation S315, if the transmitted print data includes the referenced image URL, the WiFi connection is maintained so that corresponding content is transmitted to the image forming apparatus 200 in response to the request of the image forming apparatus 200.

At operation S317, if the referenced image URL corresponds to the other control point (20-1, 20-2, . . . ) the image forming apparatus 200 may request the corresponding control point 20-1 to transmit the content and receive the content as a response.

At operation S319, the image forming apparatus 200 may print the received content according to the received print data. At operation S321, the DLNA stack unit 220 (or 'CP Wi-Fi LINK Checker') of the image forming apparatus 200 receives a notification of print job completion ('JobEndNotification'). At operation S325, the DLNA stack unit 220 waits until the time (operation S323) at which the WiFi connection of the control point 100 is re-connected according to the time information written in the connection policy. At operation S327, the DLNA stack unit 220 checks to determine if the DLNA connection of the control point 100 is re-connected (ON). Then, at operation S329, the DLNA stack unit 220 notifies the control point 100 of the 'JobEndNotification'.

Referring to FIG. 4, at operation S401, the control point 100 transmits 'CreateURLJob' to the image forming apparatus 200, requesting to perform printing. 'CreateURLJob' includes the same connection policy (i.e., 'CriticalAttribute') as illustrated in FIG. 2A. 'CreateURLJob' is the information to notify the image forming apparatus 200 to carry out printing, and difference from 'CreateJob2' is that 'CreateURLJob' includes URL information at which print data is stored. Accordingly, difference from FIG. 3 is that not only the control point 100 can transmit the print data (operation S411), but also the other control point (20-1, 20-2, . . . ) can transmit the print data (operation S413). Except for the above-mentioned difference, the remaining operations are identical to those explained above with reference to FIG. 3.

Referring to FIG. 5, at operation S501, the control point 100 transmits 'CreateJob2' to the image forming apparatus 200, thereby requesting to carry out printing. 'CreateJob2' includes the same connection policy ('CriticalAttribute') as illustrated in FIG. 2B.

Upon receiving 'CreateJob2' request, at operation S503, the image forming apparatus 200 analyzes the received connection policy, and at operation S505, notifies a job ID and a destination URL ('Datasink') to the control point 100.

At operation S507, the control point 100 transmits the print data to the image forming apparatus 200 using the received 'Datasink'. At operation S509, the control point 100 checks an address at which the content is located ('referenced image URL') in the print data transmitted to the image forming apparatus 200, and at operation S511, disconnects WiFi connection if the referenced image URL is not written in the transmitted print data, or if the referenced image URL corresponds to the other control point (20-1, 20-2, . . . ).

Meanwhile, at operation S513, if the referenced image URL exists in the transmitted print data, the WiFi connection is maintained so that the corresponding content is transmitted to the requesting image forming apparatus 200.

At operation S515, if the referenced image URL corresponds to the other control point (20-1, 20-2, . . . ), the image forming apparatus 200 requests the corresponding other control point (20-1, 20-2, . . . ) to transmit the content, and receive the requested content as a response.

At operation S517, the image forming apparatus 200 prints the received content according to the received print data. At operation S519, the SMS transmitting unit 240 of the image forming apparatus 200 receives a notification of print job completion ('JobEndNotification'), and at operation S521, notifies the 'JobEndNotification' to the SMS reception address written in the connection policy.

Referring to FIG. 6, at operation S601, the control point 100 transmits 'CreateURLJob' to the image forming apparatus 200, thereby requesting to carry out printing. 'CreateURLJob' includes the same connection policy ('CriticalAttribute') as illustrated in FIG. 2B. 'CreateURLJob' is a command requesting the image forming apparatus 200 to carry out printing process, and has a difference from 'CreateJob2' in that 'CreateURLJob' includes the URL information to receive the print data. Accordingly, operation different from FIG. 5 is operation at operation S609 in which the other control point (20-1, 20-2, . . . ) may also transmit the print data. The rest operations illustrated in FIG. 6 are identical to those explained above with reference to FIG. 5.

Figure 7:
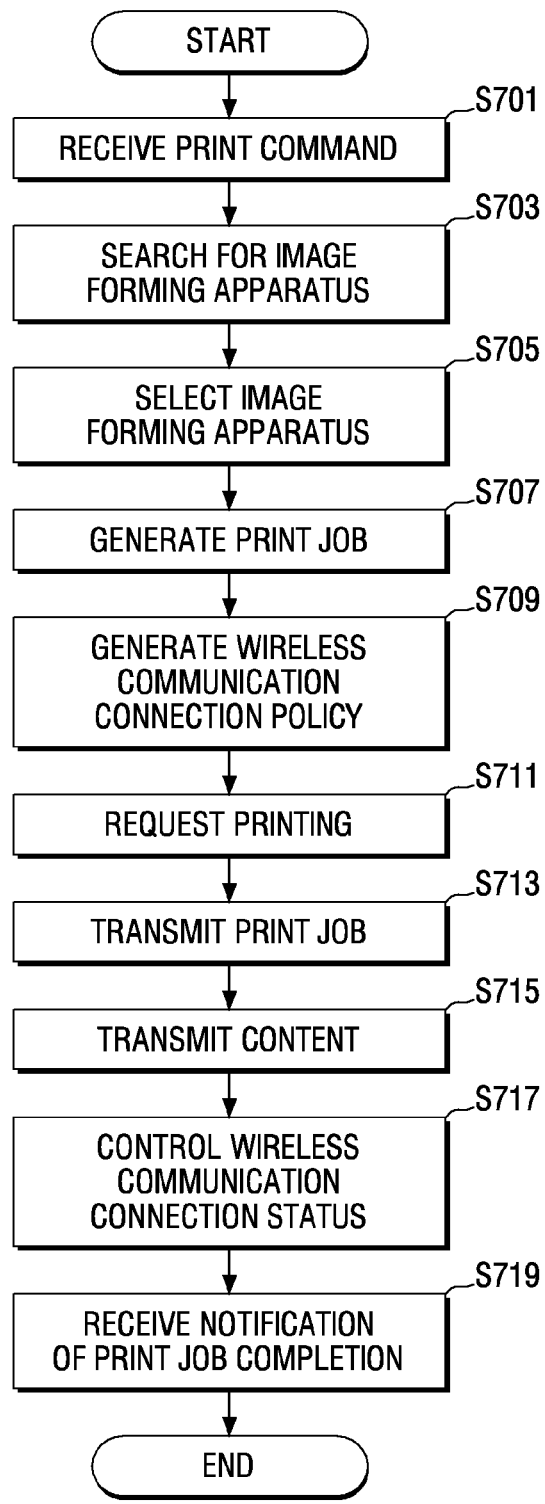
FIG. 7 illustrates a flowchart of a method of controlling printing a control point according to an embodiment of the present general inventive concept.

FIG. 7 illustrates a flowchart provided to explain a method of controlling printing in the control point according to the present general inventive concept.

Referring to FIG. 7, at operation S701, if a user command to print the content is received at operation S703, a control point 100 searches for an image forming apparatus 200 that is connected via DLNA. At operation S705, the image forming apparatuses 200 found by the above search are displayed to the user, so that the user can select the image forming apparatus 200 to perform printing from among the displayed image forming apparatuses 200.

At operation S707, print data is generated corresponding to the content that is the basis of the print command. The operation S707 may be skipped if the user's printing command corresponds to the print data already generated in the other control points (20-1, 20-2, . . . ).

At operation S709, a connection policy is generated, and at operation S711 the generated connection policy and the print request are transmitted to the selected image forming apparatus 200.

At operation S713, if a job ID and a destination URL are received from the image forming apparatus 200 as a response to the print request, the print data is transmitted to the received destination URL. At operation S715, if the user's printing command corresponds to the content stored in the control point 100, the requested content may be transmitted to the selected image forming apparatus 200 as a response to the request of the image forming apparatus 200.

At operation S717, according to the connection policy corresponding to the location at which the content is stored, it is possible to selectively control the status of DLNA connection to the selected image forming apparatus 200. Specifically, if the content is stored in the other control point (20-1, 20-2 . . . ), the DLNA connection may be disconnected after the print data regarding the content is transmitted to the selected image forming apparatus 200, while if the content is stored in the control point 100, the DLNA connection may be disconnected after the content is transmitted to the selected image forming apparatus 200.

At operation S719, if a predetermined time (Time_start) elapses from the time of DLNA disconnection, or if SMS MESSAGE is received from the selected image forming apparatus 200, the DLNA connection may be re-connected to the selected image forming apparatus and a notification of print job completion may be received.

According to the method for controlling printing of the control point explained above, since it is possible to selectively disconnect the DLNA connection to the selected image forming apparatus 200 according to the connection policy, power consumed to maintain the DLNA connection is saved. The method for controlling printing illustrated in FIG. 7 may be applied to not only the control point 100 illustrated in FIG. 1, but also the other control point with different constitutions.

Figure 8:
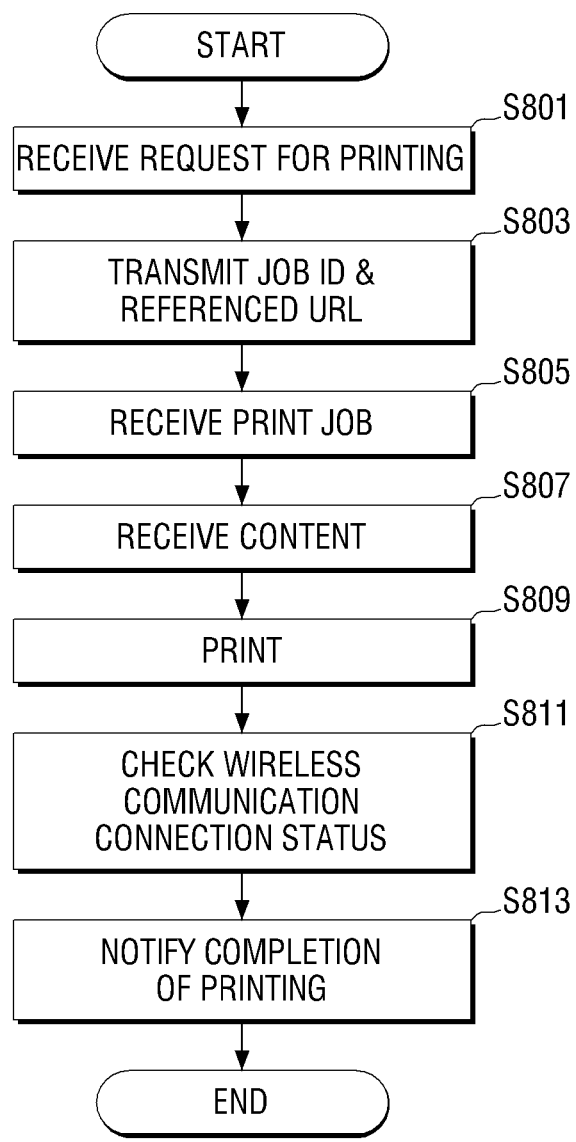
FIG. 8 illustrates a flowchart of a method of controlling printing an image forming apparatus according to an embodiment of the present general inventive concept.

FIG. 8 illustrates a flowchart provided to explain a method for controlling printing of an image forming apparatus according to the present general inventive concept.

Referring to FIG. 8, at operation S801, a print request regarding the control point 100 is received from the control point 100. The print request includes a connection policy of the control point 100.

The content and print data corresponding to the content are received as a response to the print request. Specifically, at operation S805, if 'CreateJob2' is received as a print request, print data is received from the control point 100 requesting the printing, and at operation S807, the content is received via the content address in the received print data. If 'CreateURLJob' is received as the print request, the print data may be received via the URL address written in the received 'CreateURLJob' (operation S805), and the content may be received via the content address in the received print data (operation S807).

At operation S809, the received content may be printed based on the received print data. At operation S813, a notification of print job completion regarding the content may be sent based on the received connection policy. Specifically, if the received connection policy includes SMS reception address, an SMS indicating the completion of printing may be transmitted to the SMS reception address. If the received connection policy includes the time information regarding DLNA connection, at operation S811, the DLNA connection status of the control point 100 is checked based on the time information (that is, Time_start) of the connection policy, and transmits a notice of the completion of printing to the control point 100 by the wireless communication method.

As described above, with the method of controlling printing of the image forming apparatus according to the present general inventive concept, since a connection policy is received from the control point 100, a notification of print job completion can be transmitted to the control point 100 even when the DLNA connection between the control point 100 and the image forming apparatus 200 is disconnected for a certain period of time.

Figure 9:
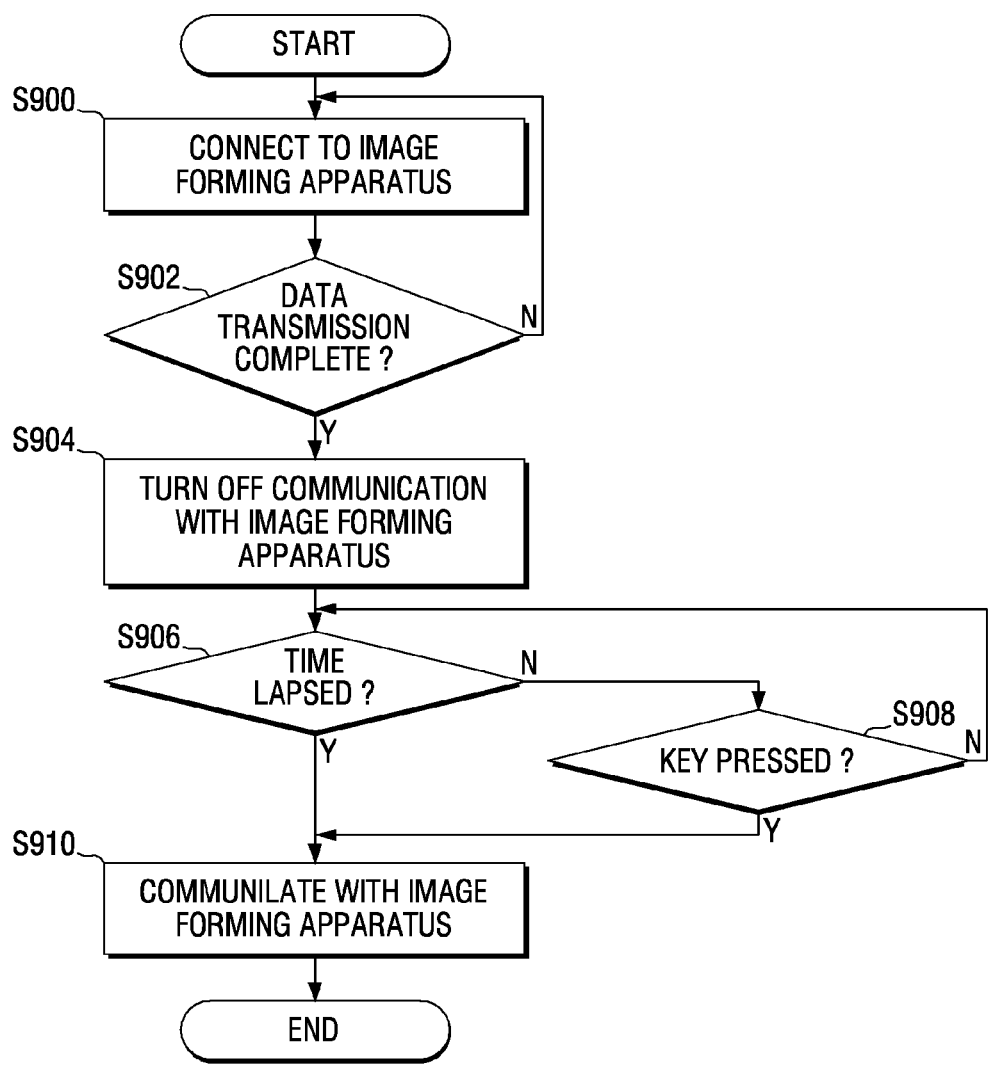
FIG. 9 illustrates a flowchart of a method of communicating between a control point and an image-forming apparatus according to an embodiment of the present general inventive concept.

FIG. 9 illustrates another flowchart of an embodiment of communicating between a control point and an image-forming apparatus. In operation S900, the control point connects to the image forming apparatus. The control point may transmit a print request and/or a job ID, for example. The control point may also generate and transmit a connection policy to the control point.

The control point may determine in operation S902 if the data transmission to the image forming apparatus is complete. For example, if the print data is located within the control point, the connection between the control point and the image forming apparatus may remain active to transmit the print data. On the other hand, if the print data is located on another device external to the control point, the control point or the image forming apparatus may terminate communications between the devices in operation S904. In addition, even when the print data is located on the control point, such as in memory in the control point, the control point may terminate communications after the print data has been transmitted.

Terminating or turning off communications may include turning off a communication port so that data that is on the port is ignored, turning off a wireless transceiver, ignoring data from the address corresponding to the image-forming apparatus, or any other appropriate method to conserve power in the control point. The turned off communications may be considered an idle mode, a power save mode, a default mode, or a similar power-saving mode.

Once the communication is terminated, the control point may determine in operation S906 whether a predetermined period of time has lapsed. The predetermined period of time may be set by the connection policy. Once the predetermined period of time has lapsed, the control point or the image forming apparatus may re-connect with the other device in operation S910 to communicate regarding the print operation. Since the control point transmitted the connection policy to the image forming apparatus in operation S900, the image forming apparatus may be programmed to transmit the data regarding the print operation at the predetermined period of time, or at predetermined intervals of time.

In addition, if the predetermined period of time has not lapsed, the control point may determine in operation S908 whether a key is pressed by a user, and if the key is pressed, the control point may resume communications with the image forming apparatus in operation S910.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A control point apparatus connectable to one or more image forming apparatuses using digital living network alliance (DLNA), the control point apparatus comprising:
   a communication interface to search the one or more image forming apparatuses using the DLNA;
   a user interface (UI) unit through which at least one piece of content is selected for printing using a user interface of the control point apparatus, and through which an image forming apparatus is selected from among the searched image forming apparatuses to perform printing;
   a DLNA stack unit to set a connection policy regarding connection to the selected image forming apparatus, and to selectively control the DLNA connection status to the selected image forming apparatus according to the connection policy, the DLNA stack unit disconnecting the control point apparatus from the selected image forming apparatus after print data corresponding to the selected content-for-printing has been transmitted to the selected image forming apparatus, or connecting and disconnecting the control point apparatus from the selected image forming apparatus at predetermined intervals of time; and
   a controller to control the communication interface to transmit the print data corresponding to the selected content-for-printing and the connection policy to the selected image forming apparatus, and to re-send the connection policy to the selected image forming apparatus if an acknowledgement in response to the connection policy is not received from the selected image-forming apparatus within a predetermined time.

2. The control point apparatus of claim 1, wherein the connection policy comprises at least one of: manner of ending connection, time to start connection, time to end connection, time interval between connected status (ON) and disconnected status (OFF), and reception information of the control point.

3. The control point apparatus of claim 2, wherein the reception information of the control point apparatus comprises address information of the control point to receive a notification of print job completion.

4. The control point apparatus of claim 1, wherein the DLNA stack unit maintains the control point in a disconnected status (OFF) until a notification of print job completion is received from the selected image forming apparatus according to the connection policy, or periodically connects (ON) and disconnects (OFF) the control point from the selected image forming apparatus to receive the notification of print job completion from the selected image forming apparatus.

5. The control point apparatus of claim 1, wherein the communication interface receives a response to the transmitted connection policy from the selected image forming apparatus.

6. The control point apparatus of claim 1, wherein, if the content-for-printing is stored in an external control point, the DLNA stack unit disconnects the DLNA connection from the selected image forming apparatus after print data corresponding to the content-for-printing is transmitted to the selected image forming apparatus, and if the content-for-printing is stored in the control point, the DLNA stack disconnects the DLNA connection from the selected image forming apparatus after the content-for-printing is transmitted to the selected image forming apparatus.

7. The control point apparatus of claim 6, wherein the DLNA stack unit re-connects the DLNA connection to the selected image forming apparatus if a predetermined time elapses from the time at which the DLNA connection is disconnected from the selected image forming apparatus or if a short message service (SMS) is received from the selected image forming apparatus.

8. A method of controlling printing of a control point apparatus which is connectable to one or more image forming apparatuses using digital living network alliance (DLNA), the method comprising:
selecting one or more content-for-printing using a user interface (UI) of the control point apparatus;
searching for one or more image forming apparatuses using the DLNA;
selecting an image forming apparatus to perform printing from among the image forming apparatuses identified in the search;
setting a connection policy regarding connection to the selected image forming apparatus;
transmitting print data and the connection policy corresponding to the selected content-for-printing to the selected image forming apparatus;
re-sending the connection policy to the selected image forming apparatus if an acknowledgement in response to the connection policy is not received from the selected image-forming apparatus within a predetermined time; and
selectively controlling the DLNA connection to the selected image forming apparatus according to the connection policy to disconnect the control point apparatus from the selected image forming apparatus after the print data has been transmitted to the selected image forming apparatus, or to connect and disconnect the control point apparatus from the selected image forming apparatus at predetermined intervals of time.

9. The method of claim 8, wherein the connection policy comprises at least one of a manner of terminating connection, a time to start connection, a time to end connection, a time interval between connected status (ON) and disconnected status (OFF), and reception information of the control point apparatus.

10. The method of claim 9, wherein the reception information of the control point apparatus comprises address information of the control point apparatus to receive a notification of print job completion.

11. The method of claim 8, wherein the selectively connecting the DLNA connection comprises:
maintaining a disconnected status (OFF) of the control point apparatus from the selected image forming apparatus until a notification of print job completion is received from the selected image forming apparatus according to the connection policy, or periodically connecting (ON) and disconnecting (OFF) the connection to receive the notification of print job completion from the selected image forming apparatus.

12. The method of claim 8, further comprising receiving a response to the transmitted connection policy from the selected image forming apparatus.

13. The method of claim 8, wherein the selectively controlling the DLNA connection comprises:
if the content-for-printing is stored in an external control point apparatus, disconnecting the DLNA connection from the selected image forming apparatus after print data regarding the content-for-printing is transmitted to the selected image forming apparatus, and if the content-for-printing is stored in the control point apparatus, disconnecting the DLNA connection from the selected image forming apparatus after the content-for-printing is transmitted to the selected image forming apparatus.

14. The method of claim 13, wherein the selectively controlling the DLNA connection comprises:
re-connecting the DLNA connection to the selected image forming apparatus if a predetermined time elapses from the time at which the DLNA connection is disconnected from the selected image forming apparatus or if a short message service (SMS) is received from the selected image forming apparatus.

15. A control point apparatus of a digital living network alliance (DLNA) network including at least one image forming apparatus, comprising:
a user interface to initiate a print operation;
a DLNA stack unit to generate a connection policy to control a DLNA connection between the control point apparatus and the image forming apparatus, the DLNA stack unit disconnecting the control point apparatus from the image forming apparatus after print data corresponding to the print operation has been transmitted to the image forming apparatus, or connecting and disconnecting the control point apparatus from the image forming apparatus at predetermined intervals of time;
a communication interface to transmit to the image forming apparatus the connection policy and the print data corresponding to the print operation; and
a controller to control the communication interface to transmit the connection policy and print data to the image forming apparatus, to re-send the connection policy to the image forming apparatus if an acknowledgement in response to the connection policy is not received from the image forming apparatus within a predetermined time, and to control a connection status between the communication interface and the image forming apparatus according to the connection policy.

16. The control point apparatus according to claim 15, the controller controls the communication interface such that when the print data is transmitted to the image forming apparatus from a device external to the control point apparatus, the controller disconnects the control point apparatus from the image forming apparatus after transmitting the print request and connection policy, and when the print data is transmitted to the image forming apparatus from the control point apparatus, the controller maintains a data connection between the control point apparatus and the image forming apparatus during a corresponding print operation of the image forming apparatus.

17. The control point apparatus according to claim 16, wherein, after disconnecting the control point apparatus from the image forming apparatus, the controller further re-connects the control point apparatus to, and disconnects the control point apparatus from, the image forming apparatus at predetermined intervals of time to receive data from the image forming apparatus regarding the corresponding print operation.

18. The control point apparatus according to claim 16, wherein, when the print data is transmitted to the image forming apparatus from a device external to the control point apparatus, the communication interface receives an SMS message regarding a completion of the corresponding print operation when the corresponding print operation is completed.

* * * * *